United States Patent
Gros

[11] 4,060,015
[45] Nov. 29, 1977

[54] APPARATUS AND METHOD FOR MANUFACTURING RESILIENT BANDS

[76] Inventor: Chajim Gros, 172, Gladstone Park Gardens, London, N.W. 2 GRL, England

[21] Appl. No.: 662,253

[22] Filed: Feb. 27, 1976

Related U.S. Application Data

[62] Division of Ser. No. 536,464, Dec. 26, 1974, Pat. No. 3,968,710.

[30] Foreign Application Priority Data

Dec. 29, 1973 United Kingdom ............... 60165/73

[51] Int. Cl.² .............................................. B26D 1/18
[52] U.S. Cl. .......................................... 83/19; 83/42; 83/54; 83/154; 83/176; 83/282; 83/488
[58] Field of Search ................... 83/54, 42, 18, 23, 47, 83/154, 151, 255, 278, 408, 17, 19, 282, 176, 488

[56] References Cited

U.S. PATENT DOCUMENTS

| 2,539,372 | 1/1951 | Metzler | 83/54 X |
| 2,651,364 | 9/1953 | Ashman | 83/54 X |
| 3,516,312 | 6/1970 | Nordberg et al. | 83/42 |
| 3,955,455 | 5/1976 | Guzman | 83/54 X |

FOREIGN PATENT DOCUMENTS

| 1,586,650 | 1/1970 | France | 83/54 |

*Primary Examiner*—Frank T. Yost
*Attorney, Agent, or Firm*—William J. Daniel

[57] ABSTRACT

An endless elastic band is severed from a tube of resilient material while the interior of the resultant band is being engaged by tensioning fingers which can be manipulated to deliver the band in at least partially expanded condition.

7 Claims, 8 Drawing Figures

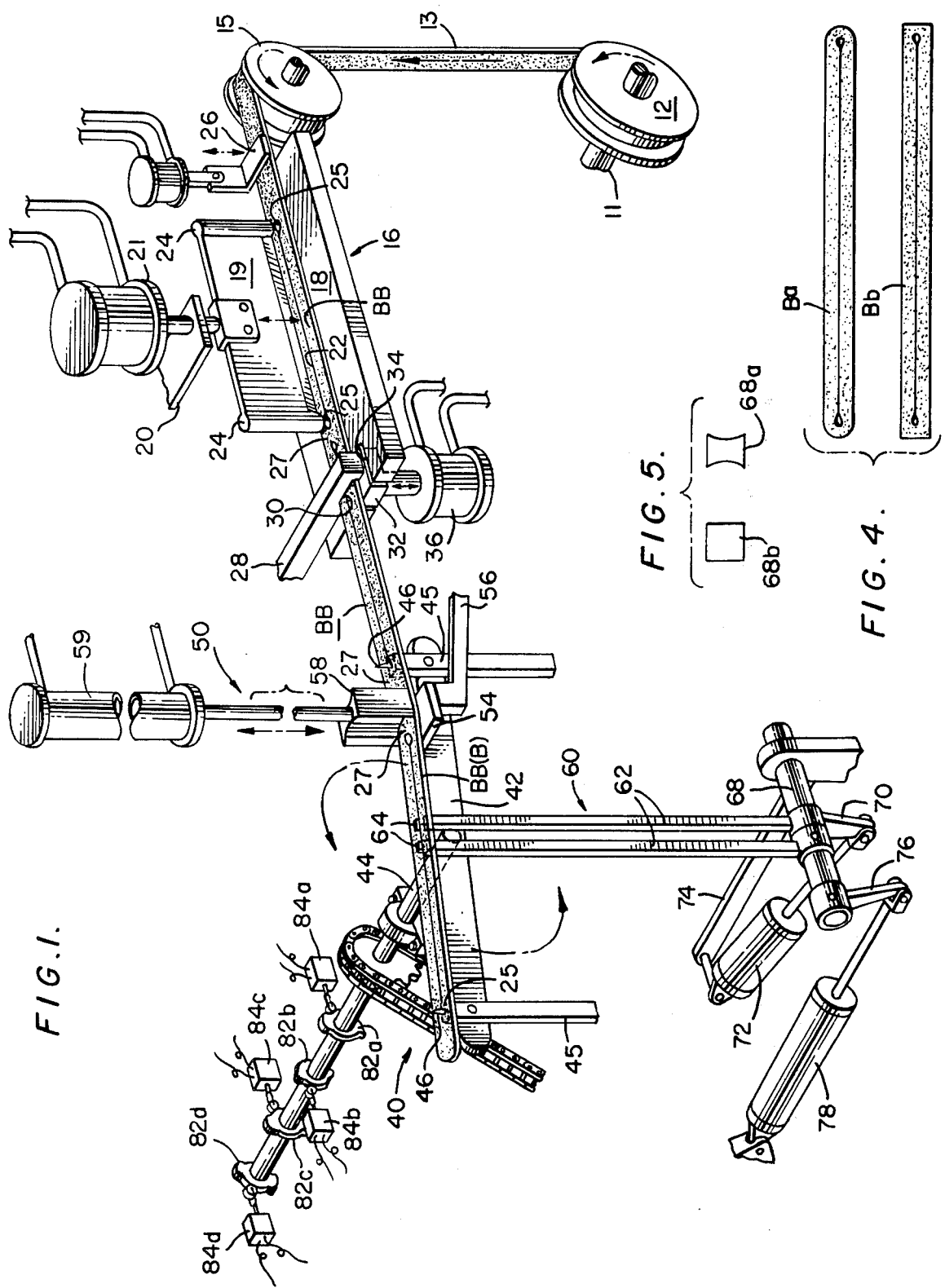

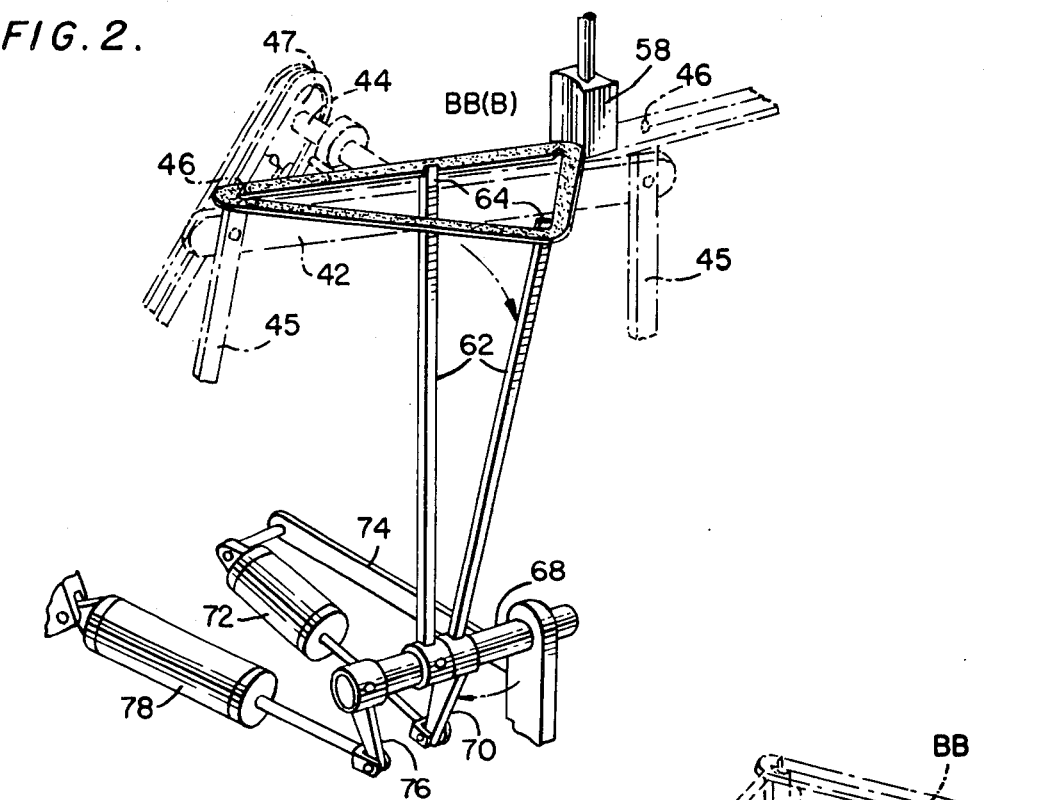
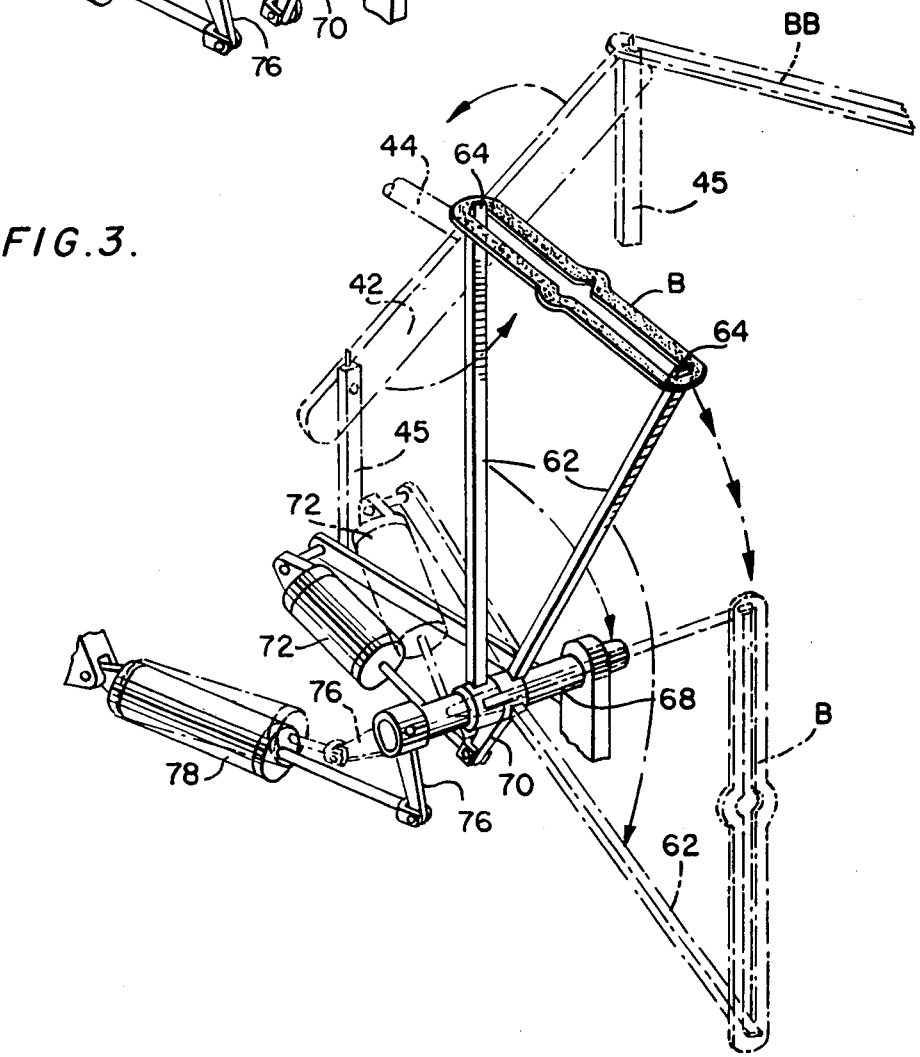

4,060,015

APPARATUS AND METHOD FOR MANUFACTURING RESILIENT BANDS

This is a division of Ser. No. 536,464, filed Dec. 26, 1974, now U.S. Pat. No. 3,968,710 issued July 13, 1976.

FIELD OF THE INVENTION

The present invention relates to apparatus for use in the manufacture and controlled delivery of resilient, i.e., rubber, bands.

BACKGROUND OF THE INVENTION

In certain manufacturing operations, for example, in apparatus for producing plastic panties or other tubular garments as disclosed in U.S. Pat. Nos. 2,976,199 to Rand, 3,726,745 to Gidge and U.S. application Ser. No. 358,953 of Gros, it is necessary to deliver elastic bands for application to the waist and/or leg openings. Such delivery can, of course, be accomplished manually, but an automated delivery arrangement would make possible a considerable cost saving.

Pre-cut rubber bands are supplied in randomly oriented somewhat tangled condition and present formidable handling problems for automated machinery. In accordance with this invention, elastic bands are formed in situ by separation from an elongated strip or tube while under effective engagement by band gripping fingers which can be mechanically manipulated to permit reproducibly controlled delivery of the band in a generally expanded condition.

SUMMARY OF THE INVENTION

The present invention provides apparatus for manufacturing and delivering resilient bands comprising means for severing an endless band from a length of resilient material and supporting means for receiving and holding the band before it has been completely severed from the remainder of the length of material.

In one embodiment, a narrow strip or ribbon of elastic material is fed from a supply source intermittently to a slitting stage, whereby it is slit intermediate its side edges along its length, beginning a short distance from its leading end and extending the desired length according to the size of the band to a point just short of the eventual trailing end, forming a flat elongated endless band united at its trailing end to the supply strip. The leading end is releasably engaged by strip advancing means and advanced to remove the already slit length from the slitting stage to an end severing and band transferring stage and bring the next length to the slitting stage. As the leading length approaches the end severing and band transferring stage, a set of band engaging fingers enters the slit opening therein and separate laterally while maintaining tensioned engagement with the sides of the slit. A transverse shear blade then descends to sever the trailing end from the remainder of the strip and, as the band engaging fingers continue to separate laterally, the leading band end is detached from its engagement by the advancing means. The band is now held in at least partially spread or opened condition on the engaging fingers which can be manipulated to clear the path of the advancing means and deliver the band as desired.

In another embodiment, the apparatus comprises means for displacing a tube of resilient material longitudinally towards a cutting station, a finger arrangement for entering the leading end portion of the flattened tube as the tube reaches the cutting station, cutting means at the cutting station and movable transversely of the tube to sever the leading end portion of the tube from the remainder of the tube to form a band, means for urging the fingers of the finger arrangement apart to tension the severed band, and means for displacing the finger arrangement to transfer the severed band to another location.

These embodiments of apparatus for manufacturing and manipulating rubber bands and embodying the invention will now be described, by way of example, with reference to the accompanying drawings, in which:

FIG. 1 is a perspective view somewhat diagrammatic of a first type of apparatus for manufacturing and delivering rubber bands according to the invention, showing a first band length being delivered to the engaging fingers and a further band length in the course of being slit;

FIG. 2 is a fragmentary perspective view of the band transferring stage in an intermediate position and the end severing shear in operative position;

FIG. 3 is a fragmentary perspective view, similar to FIG. 2, showing the band in full transferred position in solid lines and swinging clear of the advancing means;

FIGS. 4 and 5 are plan views of two rubber bands produced by the apparatus of FIGS. 1-3, and the corresponding shear blade configuration;

Figure 6:
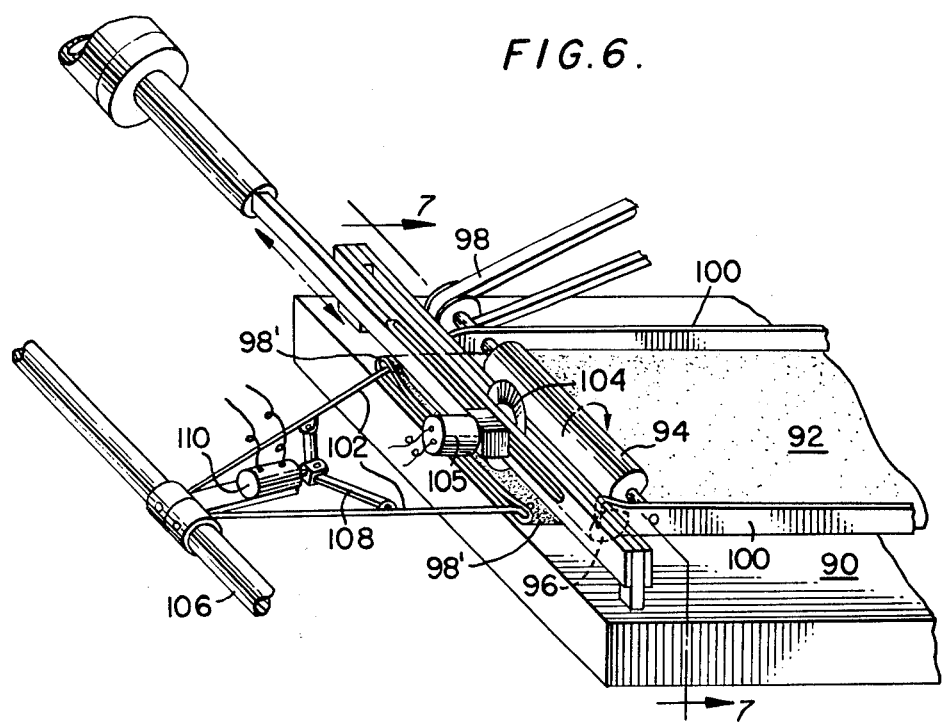
FIGS. 6 and 8 are diagrammatic perspective views of a second type of apparatus for manufacturing bands from a tube of elastic material.
Figure 7:
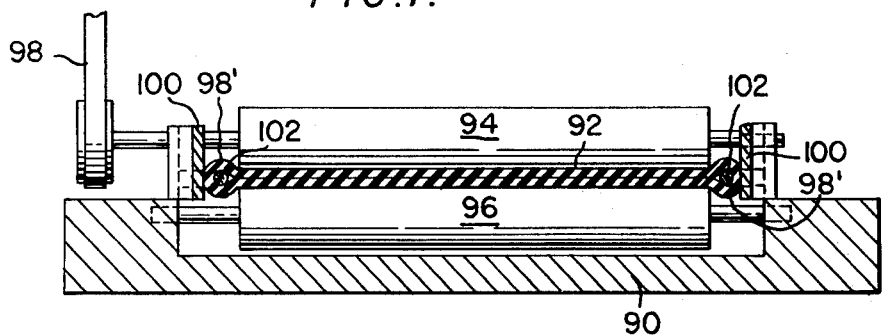
FIG. 7 is a cross-sectional view of the apparatus of FIG. 6 taken generally along line 7—7 of FIG. 6.
Figure 8:
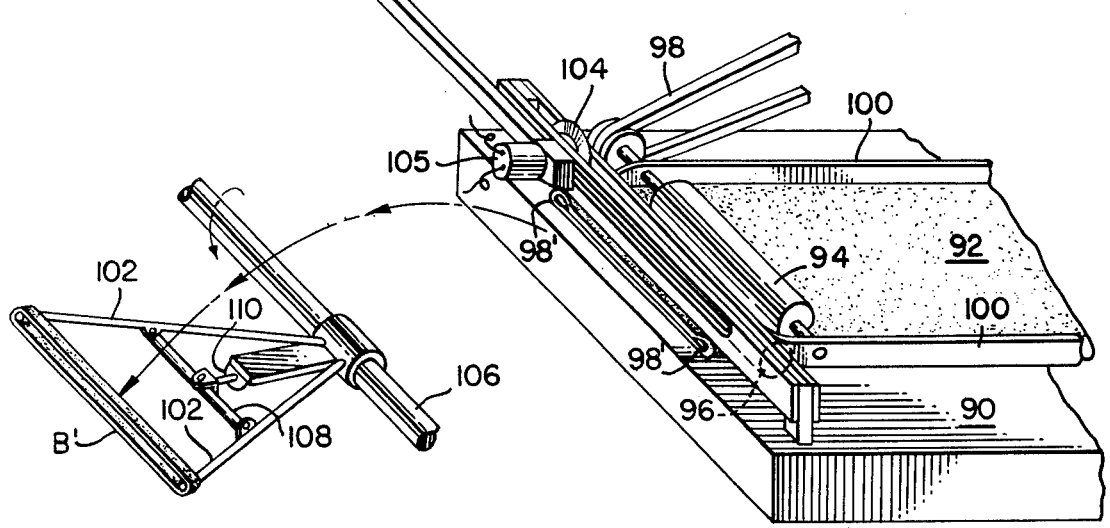

Referring now to FIG. 1, a spindle 11 supports a supply roll 12 of a natural or synthetic rubber web in the form of an elongated strip of ribbon 13 approximately twice the thickness of the ultimate band. The strip is continuously withdrawn from the roll 12 passed around a flanged guide roller 15 to a slitting station generally designated 16. The slitting station 16 has a platform 18 and a slitting knife 19 supported above platform 18 on a fixed bracket 20 for reciprocation towards and away from platform 18 by means of an air cylinder 21 to slit the strip lengthwise as at 22 through its entire thickness, forming a band bland BB joined at its leading end to an already formed blank BB and at its trailing end to the strip 13. The knife 19 extends longitudinally of the path of the strip, with a length approximately equal to the length, i.e., diameter, of the desired endless band, and has the cutting plane thereof in registration with the center line of the strip. For most elastic materials, it is desirable to develop each end of the slitting knife 19 as a tubular or tear-shaped punch 24 to form a corresponding shaped aperture 25 at each of the slit ends which has the effect of resisting propagation of the slit 22 when the band is strongly tensioned. The knife does not extend the entire length of platform 18 but stops short of the platform ends to leave a short section of unslit band as at 27, intervening between each adjacent pairs of slits and through which the strip will ultimately be transversely severed.

In order to stabilize the strip during slitting at stage 16, an intermittently operated clamp 26 is preferably provided at the upstream end of platform 18 and at the downstream end of the platform is a guide arm 28 extending over the strip with a downwardly opening notch 30 therein for preventing lateral shifting of the strip relative to knife 19. The top surface of platform 18 can for the same purpose include a longitudinal channel, not shown, loosely receiving the elastic strip. A clamping foot 32 arranged on the undersigned of platform 18 is associated with guide bar 28 working through an opening 34 adjacent the downstream end of platform 18 under the impetus of air cylinder 36 to pinch the strip against bar 28. In this way, the length of strip 13 between bar 28 and clamp 26 can be held fixed on platform 18 at both its ends during the slitting action of stage 16.

Downstream from stage 16 is a strip advancing stage 40 which, for reasons of convenient spacing of mechanical components, is separated from slitting stage 16 by a distance equal roughly to the length of one band blank BB, i.e., a distance equal to the length of one slit 22 plus one unslit section 27. While various conveying arrangements would be suitable for advancing strip 13 at stage 40, a particularly suitable embodiment takes the form of a rotary carrier bar 42 which is supported at its midpoint on a shaft 44 journaled for rotation about a horizontally disposed axis extending transversely of the bar length and the path of the rubber strip as it emerges from slitting station 16. Each side of the platform 18 supports at its distal end a freely pivoted band engaging member 45 which carries a pin 46. The pin 46 is continuously oriented in an upwardly extending direction regardless of the attitude of the rotary bar 42 by locating the center of gravity of each member 45 below its pivotal axis. Alternatively, each member 45 can be continuously maintained in a vertical attitude by other means, such as by gearing, a cam groove and follower arrangement, etc., not illustrated.

The rotary carrier bar 42 is offset laterally bodily from the path of strip 13 with the swinging band engaging members 45 projecting transversely to align the pins 46 with the center of the strip path and thus in registration with slit 22. The sahft 44 is rotated by any rotary drive means, such as a sprocket 47 fixed thereon and driven by a chain 48 engaged by a motor or the like not shown. Thus, the bar 42 and member 45 operate in "ferris-wheel" fashion, rotating in a vertical plane with the members 45 constantly oriented to direct the pins 46 upwardly.

Intermediate slitting stage 16 and advancing stage 40 is a shearing stage 50. To this end, at a point aligned with and just below the strip path inboard a distance equal to about one-half of one unslit section 27 of the upstream one of members 45, i.e., the member 45 adjacent slitting stage 16, is a fixed anvil 54 supported on a fixed bracket 56. Bracket 56 projects toward the strip path from the side opposite to bar 42 so as to clear the laterally offset path of bar 42 as well as the circular path of members 45. Cooperating with anvil 54 is a vertically reciprocating transverse shear blade 58 situated above the strip path and intermittently actuated by air cylinder 59 at an appropriate time to sever strip 13 midway of one of the unslit sections 27 and release a completed elastic band B. As indicated in FIGS. 4 and 5, the configuration of shear blade 58 is variable and can be straight to produce flat-ended bands or convexly arcuate to produce rounded-end bands.

The actuation of shear blade 58 is synchronized with the rotation of the strip advancing means such that the upstream strip engaging member 45 has swung upwardly beneath an unslit section 27 and introduced its pin 46 in the vicinity of the leading aperture 25 of the next slit 22. As the blade 58 descends to shear the unslit section inboard or downstream of member 45, it depresses section 27 to positively engage pin 46 into aperture 25. Should be pin and aperture be mis-aligned, the pin simply penetrates through a solid section of the strip without difficulty.

Once the leading end of the intervening band blank is securely lodged on the pin 46 of the upstream swinging member 45, the severance of the leading band blank by shear stage 50 can be accomplished without loss of control over the remainder of the strip, since the swinging members are weighted sufficiently below their center of gravity to sustain the strip remainder in stretched out condition. The carrier bar 42 is then rotated to lift the member 45 in a semicircular path, the remainder of the strip trailing behind and thus advancing the length of one band blank BB. The upstream clamps are released at this time although enough resistance is applied to strip 13 either through resistance in rotating rollers 12 and 15 or by clamp 26 to keep the strip and connected blanks under control. The design of shear stage 50 must be such as to lift blade 58 clear of the curved path of swinging member 45 either by means of a long air cylinder as indicated or by a suitable array of levers, not shown.

The strip advancing stage 40 also functions to transfer the advancing leading band blank BB to a band engaging stage 60 which is adapted to receive the band in a predetermined controlled manner and permit the band to be subsequently manipulated as desired under controlled reproducible conditions. Stage 60 is constituted mainly by a set of elongated fingers 62 which, in the illustrated embodiment, includes two although more could be used if desired. The fingers are arranged in a band-receiving position to present substantially aligned thin terminal portions into the interior of the slit 22 of the leading band blank BB being advanced by the advancing stage 40, separate relative to one another in a direction transverse to the strip path while maintaining engagement with opposite sides of the band, and then swing as a unit out of the path of the oncoming next blank BB to deliver the completed band B to a point of use.

Thus, the fingers terminate at their upper ends in thin tongues 64 having their planes parallel to the vertical plane of slit 22 in the advancing stage 40, and preferably taper to a reasonably sharp edge to facilitate their entry into the slit 22 of leading blank BB. Below each tonque 64 is a transverse shoulder 66 extending laterally of the finger length away from tongue 64, in a direction for each arm 62 opposite to that of the other arm 62, for abuttment with the under surface of a portion of the flat band. The finger 62 which has its shoulder projecting away from carrier arm 42, in this case, the arm at the right side, is pivoted at its lower end to a shaft 68 and is formed with a bell crank extension at 70 for operating purposes. Shaft 68 is situated below the maximum downward travel of the ends of carrier bar 42 on an axis generally parallel to a plane through slit 22 of leading band blank BB and fingers 62 are preferably arranged thereon in fairly closely spaced juxtaposed relation so that the tongues 64 at their upper ends can be nearly continuous to enter the band slit 22. The other finger 62 is fixed on shaft 68.

Fingers 62 are initially positioned together in substantially vertical position as seen in FIG. 1 and as carrier bar rotates about 180° the leading band blank BB will, after an initial upward motion, swing downwardly until the tongues 64 have penetrated slit 22 as shown. At this point, the journaled (right hand) finger 62 is pivoted laterally by means of an air cylinder 72 pivoted to bellcrank 70 and supported on a bracket 74 fixed to shaft 68 for bodily rotation therewith, as seen in an intermediate position in FIG. 2, applying tension to the band B and rotating swinging member 45 about its axis. When the fingers are separated sufficiently to have gripping engagement with the tensioned band, the leading end of band B pulls free of pin 46, releasing the band to complete its transfer to the fingers, as seen in solid lines in FIG. 3. The timing of the actuation of shear blade 58 is preferably synchronized to delay total separation of the band blank until the fingers have exercised control over the band.

The separated fingers are now pivoted bodily as a unit to remove the transferred band B from the path of the swinging members and permit the next cycle to commence. This is done by rocking shaft 68 through a crank 76 fixed to an end of shaft 68 pivoted to an air cylinder 78 to a delivery position such as can be seen in dotted lines in FIG. 3.

It is evident that the fingers 62 when operated as described can maintain a band B under direct positive control and deliver the same in a given orientation which can be repeated for any number of cycles. In the delivery position, the band B is at least partially open or spread to an extent which is determined by the length of the tongues 64, i.e., their dimension parallel to the band slit line 22, and can therefore be varied as needed. When so spread, the bands can readily collect on mandrels introduced into the band opening or can be transferred to a further similar set of fingers for manipulation in which fashion required by a given end use. These possibilities are beyond the scope of this invention and have not been illustrated.

The operation of the various stages described above will be obvious from what has already been said. It will also be appreciated that the timing of the stages can be controlled automatically through conventional microswitches arranged to sense the occurrence of a preceding function and regulate conventional valves controlling the air flow to the several air cylinders. For example, as appears in FIG. 1, carrier bar shaft 44 can carry a plurality of cams 82 a, b, c, d which cooperate with microswitches 84 a, b, c, d. The air cylinders for the clamps 26 and 32 cooperate together in response to switch 84a when the bar has rotated about 150°–160° and hold until about 200°–210°. The slitting and shear blade are actuated together by switch 84b as soon as the clamps are engaged, i.e., at about 180°, and are immediately returned to starting position. The cylinder 72 is actuated by switch 84c roughly simultaneously or just after switch 84b, while cylinder 78 is actuated by switch 84d as soon as the movement of the first finger is complete. Variations are, of course, readily possible. For instance, instead of moving the swinging band engaging members 45 in a circular endless path, they could be advanced along an elongated endless path carried on a flexible chain rather than the rigid carrier bar. The cyclical movement of such members 45 can be intermittent but is preferably continuous.

An alternative form of apparatus is shown in FIG. 5 and includes a table 90 over which a flattened tube 92 of elastic material is fed by a pair of opposed pinch rollers 94,96 supported on table 90 for rotation and driven intermittently by means of a chain and sprocket drive 97. As shown in FIG. 6, rollers 94,96 are shorter than the flattened out lateral dimension of tube 92 and stop at each end somewhat short of the sides of the tube so as to leave loop-like tube side portions 98 extending to either side of the punch rollers. These loop-like portions are expanded vertically into a more cylindrical shape by applying inwardly directed pressure against the extreme sides of the tube by means of guide plates 100 upstanding from table 90 in the region of rollers 94,96 on either side of tube 92 and converging inwardly enough to buckle the tube side walls slightly inwardly.

A pair (or more) of tube-engaging fingers 102 are arranged in spaced relation at their free ends to project into the interior of the expanded loop-like portions 98 and a transversely reciprocating shear blade 104 rotated by a motor 105 is provided for movement along a shear locus intermediate the egress side of pinch rollers 94,96 and the free ends of band-engaging fingers 102 to separate a short longth of the tube 92 from the remainder thereof. The fingers 102 are fixed at their opposite ends to a supporting shaft 106 extending generally perpendicularly to the length of tube 92 at approximately the horizontal level of table 90.

The end length BB' of tube 92 is, of course, already loosely on the ends of fingers 102 before it is separated by shear blade 104 and, to afford positive engagement with the thus-formed endless band B', the fingers are preferably expanded laterally apart to promptly tension the separated band. To this end, a toggle linkage 108 is connected at its ends to opposite intermediate points along fingers 102 and at its center pivot to the armature solenoid 110. When solenoid 110 is electrically actuated, the toggle linkage is straightened, flexing the fingers outwardly into firm gripping engagement with the inside of the side loops 98 of the cut band B'. Shaft 106 can now be rotated about its axis by means not shown to deliver band B' in the same manner as in the earlier embodiment, after which it is returned to starting position to repeat the cycle.

Variations are equally possible in the embodiment of FIGS. 5 and 6 especially as to the choice of a rotating cutter blade versus a guillotine type blade for severing the tube length.

What is claimed is:

1. Apparatus for use in the manufacture of resilient bands comprising means for displacing a tube of resilient material longitudinally towards a cutting station, a band engaging station downstream of said cutting station and comprising at least two spaced fingers for entering the leading end portion of the tube on the egress side of the cutting station, cutting means at the cutting station and movable transversely of the tube to sever the leading end portion of the tube from the remainder of the tube to form a band, means for urging the fingers of the finger arrangement apart to tension the severed band against said fingers, and means for displacing the spread fingers bodily to remove the severed band from said cutting station to clear said cutting station for the next cycle.

2. The apparatus according to claim 1 including means for flattening said tube for delivery to said cutting station.

3. The apparatus according to claim 2 wherein said flattening means stops short of the U-shaped sides of said tube and including means for compressing each of said U-shaped sides laterally upwardly to open the same for easy entry of one of said band-engaging fingers.

4. Apparatus for use in the manufacture of resilient bands comprising means for repetitively severing from a length of tubular material transverse sections thereof which are short compared to the material length to form endless bands of said material and means adjacent said one end for mechanically engaging said successive short transverse sections one by one before severance thereof from said tubular length and independently of the remainder of said tubular length to permit removal of such sections after severance thereof.

5. The apparatus of claim 4, wherein said mechanical engaging means comprises fingers for introduction through the opening of said one end of said material length and engagement of the finger ends with opposite sides of a terminal short length of said material before several thereof.

6. A method of manufacturing endless elastic bands which comprises the steps of advancing a length of tubular elastic material through a severing stage to sever from one end of said length successive transverse sections thereof which are short compared to the material length to form endless bands, and before each said short section is severed from the remainder of the length, mechanically engaging each such short transverse section individually one by one and independently of the remainder of the the material length to permit each severed section to be removed from said severing stage.

7. The method of claim 6, wherein each said transverse section is mechanically engaged by introducing plural members into the opening of said one end and moving said members apart into engagement with opposite sides of a short terminal section of said material length before severance thereof.

* * * * *